United States Patent
Jiménez et al.

(10) Patent No.: US 12,494,989 B2
(45) Date of Patent: Dec. 9, 2025

(54) CONTROLLING TRANSMISSION OF DATA IN A NETWORK

(71) Applicant: Telefonaktiebolaget LM Ericsson (publ), Stockholm (SE)

(72) Inventors: Jaime Jiménez, Espoo (FI); Ari Keränen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 353 days.

(21) Appl. No.: 18/257,351

(22) PCT Filed: Dec. 17, 2020

(86) PCT No.: PCT/EP2020/086713
§ 371 (c)(1),
(2) Date: Jun. 14, 2023

(87) PCT Pub. No.: WO2022/128093
PCT Pub. Date: Jun. 23, 2022

(65) Prior Publication Data
US 2024/0031276 A1    Jan. 25, 2024

(51) Int. Cl.
*H04L 45/122* (2022.01)
*H04L 45/00* (2022.01)
*H04W 60/04* (2009.01)

(52) U.S. Cl.
CPC ............ *H04L 45/122* (2013.01); *H04L 45/20* (2013.01); *H04W 60/04* (2013.01)

(58) Field of Classification Search
None
See application file for complete search history.

(56) References Cited

U.S. PATENT DOCUMENTS

| 9,667,528 B2 * | 5/2017 | Banerjee ................ H04L 45/48 |
| 2009/0296588 A1 | 12/2009 | Nishi et al. |

(Continued)

OTHER PUBLICATIONS

International Search Report and Written Opinion dated Jul. 22, 2021 for International Application No. PCT/EP2020/086713 filed Dec. 17, 2020, consisting of 12-pages.

(Continued)

*Primary Examiner* — Anh Vu H Ly
(74) *Attorney, Agent, or Firm* — Weisberg I.P. Law, P.A.

(57) ABSTRACT

Methods of a Lightweight Machine to Machine (LwM2M) device and of an LwM2M managing device of controlling transmission of data in a network. A method of an LwM2M device is provided of for controlling transmission of data in a network includes sending a message having data towards an intended receiver. The message includes information indicating a maximum number of hops allowed for the message, thereby allowing a node in the network receiving the message at each hop to update a hop counter and further to discontinue forwarding of the message towards the intended receiver when the hop counter indicates that the maximum number of hops has been reached. The method includes receiving, from the node, an indication that the hop counter has reached the maximum number of hops and sending, to an LwM2M managing device, information indicating that the hop counter has reached the maximum number of hops.

20 Claims, 3 Drawing Sheets

(56) References Cited

U.S. PATENT DOCUMENTS

| | | | |
|---|---|---|---|
| 2010/0316048 A1* | 12/2010 | Reyes | H04L 12/66 |
| | | | 370/389 |
| 2014/0032784 A1* | 1/2014 | Rollins | H04L 12/185 |
| | | | 709/241 |
| 2021/0083965 A1* | 3/2021 | Taft | H04L 1/0016 |
| 2022/0069892 A1* | 3/2022 | Strater | H04L 45/122 |

OTHER PUBLICATIONS

Anonymous; Time to Live and IP Packets; Wikipedia; Nov. 1, 2020, consisting of 3-pages.

Lightweight Machine to Machine Technical Specification: Core; Open Mobile Alliance (OMA) SpecWorks; Approved Version 1.2; Nov. 10, 2020, consisting of 154-pages.

M. Boucadair et al.; Constrained Application Protocol (CoAP) Hop-Limit Option, RFC 8768; Internet Engineering Task Force (IETF); Standards Track; Mar. 2020, consisting of 8-pages.

* cited by examiner

CONTROLLING TRANSMISSION OF DATA IN A NETWORK

CROSS-REFERENCE TO RELATED APPLICATION

This application is a Submission Under 35 U.S.C. § 371 for U.S. National Stage Patent Application of International Application Number: PCT/EP2020/086713, filed Dec. 17, 2020 entitled "CONTROLLING TRANSMISSION OF DATA IN A NETWORK," the entirety of which is incorporated herein by reference.

TECHNICAL FIELD

The present disclosure relates to a method of a Lightweight Machine to Machine (LwM2M) device of controlling transmission of data in a network, a method of an LwM2M managing device of controlling transmission of data in a network, an LwM2M device configured to control transmission of data in a network, an LwM2M managing device configured to control transmission of data in a network, corresponding computer program products, and corresponding computer readable mediums.

BACKGROUND

The "Internet of Things" (IoT) refers to devices enabled for communication network connectivity, so that these devices may be remotely managed, and data collected or required by the devices may be exchanged between individual devices and between devices and application servers.

A popular vision of IoT comprises large numbers of such small autonomous devices, transmitting and receiving only small amounts of data, typically relatively infrequently. IoT devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IP) v4 or IPv6, and dedicated protocols for constrained devices, including for example the Constrained Application Protocol (CoAP) and Message Queueing Telemetry Transport (MATT) protocol.

The Constrained Application Protocol (CoAP) is a RESTful ("Representational State Transfer") IoT protocol suitable for constrained nodes and networks. MQTT is a lightweight publish-subscribe messaging protocol designed for constrained devices and low-bandwidth, high-latency and unreliable networks. Lightweight Machine to Machine (LwM2M) is a protocol for device management and service enablement that is standardised by the Open Mobile Alliance (OMA). LwM2M was originally built on CoAP, but in the latest version of the LwM2M specification (version 1.2), MQTT is also supported.

Transmission of data between constrained IoT devices in a network applying the LwM2M protocol occasionally occurs via proxy nodes, which may cause undesirable infinite forwarding loops for the transmitted data.

SUMMARY

One objective is to solve, or at least mitigate, this problem in the art and thus to enable LwM2M devices of controlling transmission of data in a network.

This objective is attained in a first aspect by a method of an LwM2M device of controlling transmission of data in a network. The method comprises sending a message comprising data towards an intended receiver, the message including information indicating a maximum number of hops being allowed for the message, thereby allowing a node in the network receiving the message at each hop to update a hop counter and further to discontinue forwarding of the message towards the intended receiver when the hop counter indicates that the maximum number of hops has been reached and receiving, from said node, an indication that the hop counter has reached the maximum number of hops. The method further comprises sending, to an LwM2M managing device, information indicating that the hop counter has reached the maximum number of hops.

This objective is attained in a second aspect by a method of an LwM2M managing device of controlling transmission of data in a network. The method comprises receiving, from an LwM2M device, an indication that a maximum number of hops allowed for a message sent from the LwM2M device towards an intended receiver has been reached without the message having been received by the intended receiver.

This objective is attained in a third aspect by a computer program comprising computer-executable instructions for causing an LwM2M device or an LwM2M managing device to perform the method according to the first or second aspect, respectively, when the computer-executable instructions are executed on a processing unit included in the LwM2M device or the LwM2M managing device.

This objective is attained in a fourth aspect by a computer program product comprising a computer readable medium, the computer readable medium having the computer program according to the third aspect embodied thereon.

This objective is attained in a fifth aspect by an LwM2M device configured to control transmission of data in a network. The LwM2M device comprises a processing unit and a memory, said memory containing instructions executable by said processing unit, whereby the LwM2M device is operative to send a message comprising data towards an intended receiver, the message including information indicating a maximum number of hops being allowed for the message, thereby allowing a node in the network receiving the message at each hop to update a hop counter and further to discontinue forwarding of the message towards the intended receiver when the hop counter indicates that the maximum number of hops has been reached and to receive, from said node, an indication that the hop counter has reached the maximum number of hops. The LwM2M device is further operative to send, to an LwM2M managing device, information indicating that the hop counter has reached the maximum number of hops.

This objective is attained in a sixth aspect by an LwM2M managing device configured to control transmission of data in a network. The LwM2M managing device comprises a processing unit and a memory, said memory containing instructions executable by said processing unit, whereby the LwM2M managing device is operative to receive, from an LwM2M device, an indication that a maximum number of hops allowed for a message sent from the LwM2M device towards an intended receiver has been reached without the message having been received by the intended receiver.

Advantageously, an LwM2M device informs an LwM2M managing device that a hop-limit was reached for a message being transported in the network, and possibly further informs the LwM2M managing device of the hop-limit and that data in the message never reached an intended receiver.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
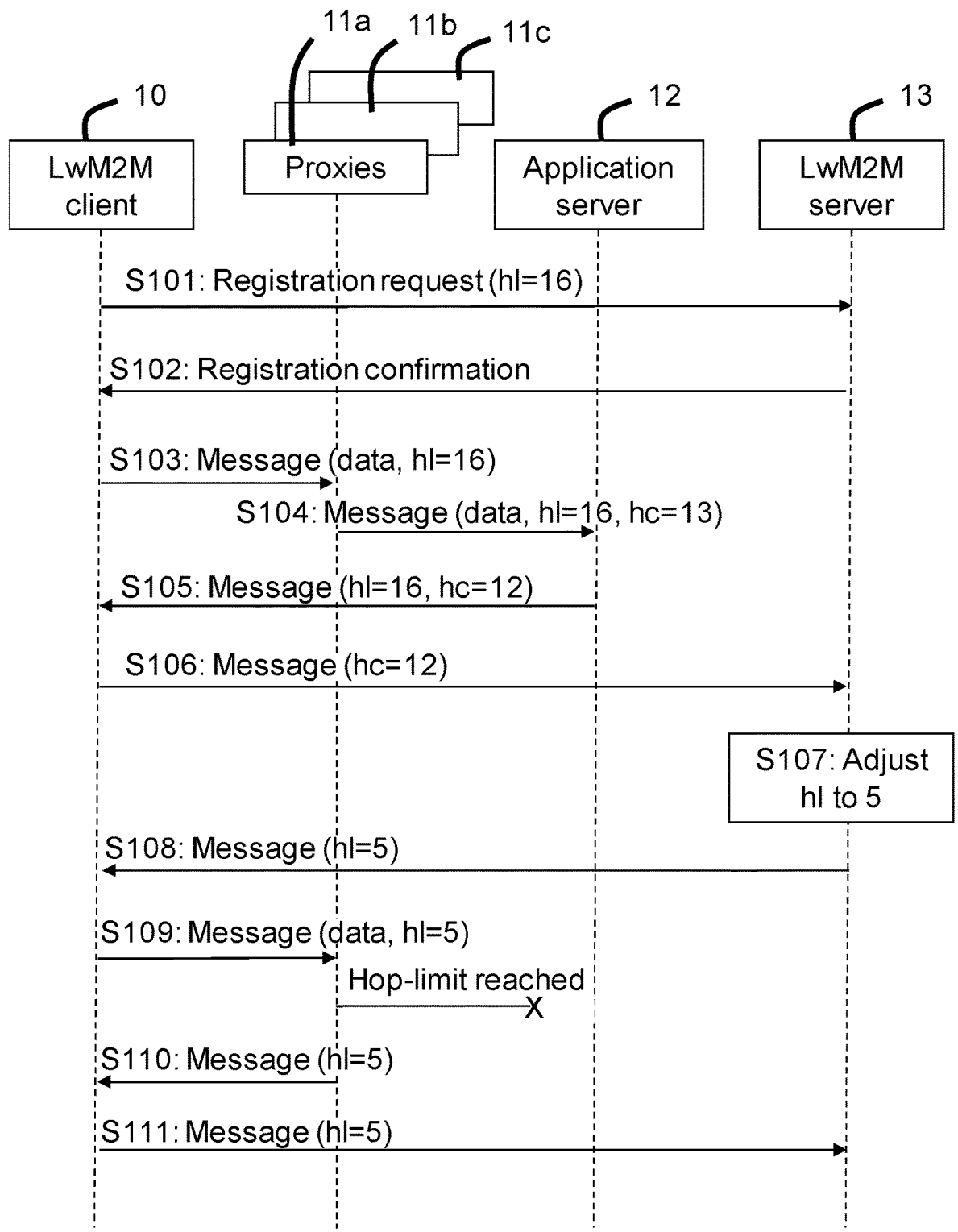
FIG. 1 shows a signalling diagram illustrating a method of controlling transmission of data in a network according to an embodiment.

FIG. 1 shows a signalling diagram illustrating a method of controlling transmission of data in a network according to an embodiment.

Shown in FIG. 1 are two IoT devices supporting LwM2M (commonly referred to as LwM2M endpoints), in this case exemplified as a LwM2M client device 10 and a LwM2M server device 13. Hence, these are computing devices operable to run LwM2M, and may comprise an IoT device, or a low-power wide-area network (LPWAN) device. The LwM2M server device 13 is typically an LwM2M managing device which has knowledge of network topology.

As will be discussed in more detail in the following, communication between the LwM2M client 10 and an intended receiver of data, in this embodiment the application server 12, may occur via one or more proxy nodes such as proxy servers 11a-11c (referred to in the following as "proxies").

Initially, the LwM2M client 10 performs a registration with the LwM2M server 13 (being the LwM2M managing device) in steps S101 and S102, where the LwM2M server 13 will determine whether or not a hop-limit value has been set at the LwM2M client 10, which specifies a maximum number of hops that is allowed for data sent from the LwM2M client 10. In LwM2M, the default hop-limit (hl) value is set to "16".

Thus, the LwM2M client 10 sends the registration request comprising the hop-limit value in step S101 to the LwM2M server 13 which confirms the request in step S102, whereupon the LwM2M server 13 is made aware of the hop-limit value and communication may commence for the LwM2M client 10.

Now, after the initial registration, the LwM2M client 10 transmits payload data to the application server 12, which data in this example will traverse the three proxies 11a-11c.

Thus, the data is transmitted in step S103 from the LwM2M client 10 to first proxy 11a, which in its turn transmits data to second proxy 11b, which in its turn transmits the data to third proxy 11c, which finally transmits the data to the application server 12 in step S104.

In this example, if the data is sent from the LwM2M client 10 to the application server 12 via three proxies 11a-11c, the hop-limit value must be set to at least "4", or the data will not reach the application server 12 (which in this example is four hops away from the LwM2M client 10. As is understood, in practice a great number of proxies may be traversed, far more than "16", in which case the hop-limit value must be set accordingly.

In order to keep track of number of hops being performed, each proxy will update a hop counter.

For each hop being performed, the device receiving the message at each hop will decrease a hop counter by "1" (initially starting at the hop-limit value), having as an effect that when the message reaches the first proxy in step S103, the hop counter is decreased to "15", the second proxy 11b decreases the hop counter to 14 and the third proxy 11c will in its turn decrease the hop counter to 13. As is noted, the LwM2M client 10 may have to indicate to the first proxy 11a, for instance by setting a message flag, that the first proxy 11a is expected to start decreasing the hop counter from the initially set hop-limit value.

Finally, the data originally sent from the LwM2M client 10 reaches the application server 12 in step S104 which decreases the hop counter to "12" and returns the hop counter value ("12") to the LM2M client 10 in step S105. The hop-limit value and the hop counter value may be included in a data field of the LwM2M message header so that each node can access the two values and decrease the hop counter value accordingly at each hop being performed. Embodiments may also use a single value which initially represents the hop-limit and which is decreased by one at each hop until it reaches zero and is not forwarded anymore.

In an optional embodiment, in order to make the LwM2M server 13 aware of the current hop counter value of "12", the LwM2M client 10 transmits the current hop counter value ("12") to the LwM2M server 13 in step S106. The message being sent in step S106 may or may not include the hop-limit value ("16"). It is noted that the LwM2M server 13 was made aware of the hop-limit value already in step S101.

Further optionally, the LwM2M server 13 may adjust the hop-limit value in step S107. For instance, if a difference between the hop-limit value and the current hop counter value is considered too great, as determined for instance by comparing the difference to a predetermined threshold value, the LwM2M server 13 may reduce the hop-limit value. In this particular example, the LwM2M server 13 reduces the hop-limit value to "5" thereby allowing a small margin with respect to the current hop counter value ("12").

The LwM2M server 13 returns the adjusted hop-limit value ("5") to the LwM2M client 10 in step S108. If no adjustment is made, the LwM2M server 13 may send only a confirmation in step S108 that the message of S106 was received.

In the following steps S109 and S110, a scenario will be described where a loop occurs for data sent by the LwM2M client 10 intended for the application server 12.

Thus, the LwM2M client 10 sends a message including the data as well as the adjusted hop-limit value being "5" in step S109, which reaches the first proxy 11a decreasing the hop counter to "4", after which the second proxy 11b decreases the hop counter to "3", and the third proxy 11c decreases the hop counter to "2".

In this scenario, instead of further transmitting the message comprising the data and the adjusted hop-limit value to the application server 12, the third proxy 11c for some reason sends the message back to the second proxy 11b which decreases the hop counter to "1" and then sends the message back to the third proxy 11c which decreases the hop counter to "0", thereby creating a loop for the message among the proxies 11a-11c.

At this stage, the hop-limit value of "0" is reached, which has as an effect that the third proxy 11c is not allowed to forward the message to the application server 11 and may even drop the message.

Further, the third proxy 11c informs the LwM2M client 10 in step S110 that the hop-limit value has been reached. At this stage, the LwM2M server 13 is not aware of that the hop-limit was reached and that the message thus did not reach the application server 12.

Advantageously, the LwM2M client 10 informs the LwM2M server 13 in step S111 that the hop-limit was reached, and possibly further informs the LwM2M server 13 of the hop-limit ("5") and that the data intended for the application server 12 never reached the application server 12.

Further advantageous is that the LwM2M server 13 for instance may inform the application server 12 that data intended for the application server 12 was dropped, or instruct the LwM2M client 10 to retransmit the dropped data to the application server 12. Further, the LwM2M server 13 may adjust the hop-limit value by increasing the value, or if found appropriate even disable the hop-limit option.

Figure 2:
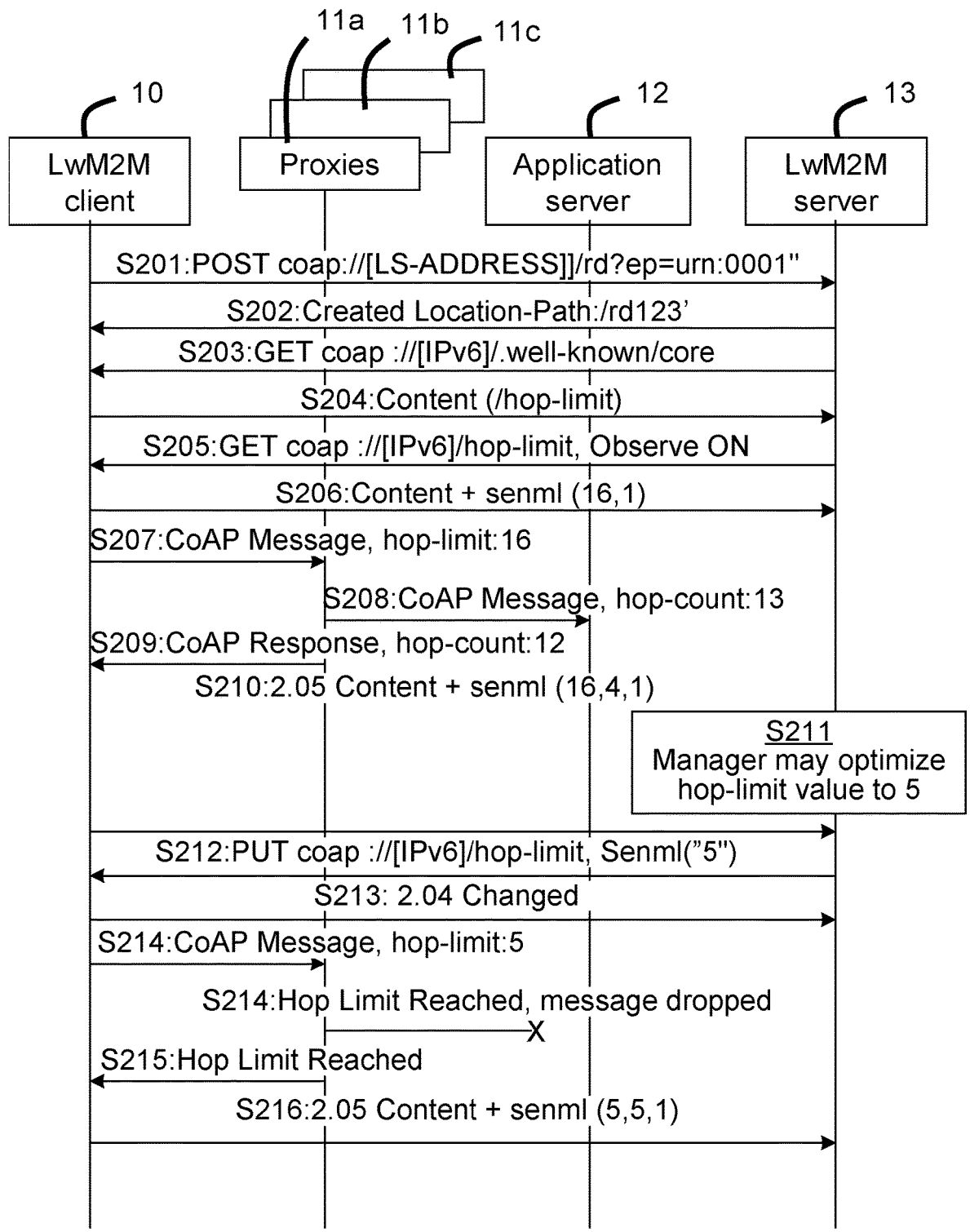
FIG. 2 shows a signalling diagram illustrating a method of controlling transmission of data in a network according to another embodiment.

FIG. 2 shows a signalling diagram illustrating a method of controlling transmission of data in a network according to an embodiment using specific LwM2M protocol terminology.

Initially, the LwM2M client 10 performs a registration with the LwM2M server 13 in steps S201-S206, where the LwM2M server 13 will determine whether or not a hop-limit value has been set at the LwM2M client 10, which specifies a maximum number of hops that is allowed for data sent from the LwM2M client 10. In LwM2M, the default hop-limit (hl) value is set to "16".

Thus, the LwM2M client 10 sends the registration request in step S201 to the LwM2M server 13 using a POST command, to which the LwM2M server 13 replies with a 2.01 (Created) Response Code including the Uniform Resource Identifier (URI of a new resource created with the request.

In step S203, the LwM2M server 13 determines with a GET command if the hop-limit indeed is activated at the LwM2M client 10. In other words, the GET command retrieves a representation for the information that currently corresponds to the resource identified by the request URI.

In response, the LwM2M client 10 indicates in step S204 that the hop-limit option is activated by sending a 2.05 Content message.

The LwM2M server 13 requests the LwM2M client 10 for the currently set hop-limit value in step S205, and the LwM2M client 10 replies by sending a message comprising the hop-limit value ("16") using for instance Sensor Markup Language (SenML) in step S206. As can be seen, the message in step S206 may further comprise an indication ("1") that the hop-limit option is activated.

Now, after the initial registration of steps S201-S206, the LwM2M client 10 transmits payload data to the application server 12, which data in this example will traverse the three proxies 11a-11c.

Thus, the data is transmitted in step S207 from the LwM2M client 10 to first proxy 11a, which in its turn transmits data to second proxy 11b, which in its turn transmits the data to third proxy 11c, which finally transmits the data to the application server 12 in step S208.

As previously discussed, for each hop being performed, the device receiving the message at each hop will decrease the hop counter by one, having as an effect that when the message reaches the first proxy in step S207, the hop counter is decreased to "15", the second proxy 11b decreases the hop counter to "14" and the third proxy 11c will in its turn decrease the hop counter to "13".

Finally, the data originally sent from the LwM2M client 10 reaches the application server 12 in step S208 which decreases the hop counter to "12" and returns the hop counter value ("12") to the LwM2M client 10 in step S209. The hop-limit value and the hop counter value may be included in a data field of the LwM2M message header so that each node can access the two values and decrease the hop counter value accordingly at each hop being performed. Alternatively, a single value may be used which is initially set to the hop-limit value when the message is created, and which subsequently is decreased by one at each hop. Once the value reaches zero, the message is not forwarded further.

In an optional embodiment, in order to make the LwM2M server 13 aware of the current hop counter value of "12", the LwM2M client 10 transmits the current hop counter value ("12") to the LwM2M server 13 in step S210. The message being sent in step S106 may or may not include the hop-limit value ("16") and an indication that the hop-limit option is enabled. It is noted that the LwM2M server 13 was made aware of the hop-limit value already in step S206.

Further optionally, the LwM2M server 13 may adjust the hop-limit value in step S211. For instance, if a difference between the hop-limit value and the current hop counter value is considered too great, as determined for instance by comparing the difference to a predetermined threshold value, the LwM2M server 13 may reduce the hop-limit value. In this particular example, the LwM2M server 13 reduces the hop-limit value to "5" thereby allowing a small margin with respect to the current hop counter value ("12").

The LwM2M server 13 returns the adjusted hop-limit value ("5") to the LwM2M client 10 in step S212. If no adjustment is made, the LwM2M server 13 may send only a confirmation in step S108 that the message of S106 was received.

The LwM2M client 10 confirms the adjusted allowable hop-limit of "5" with a 2.04 (Changed) Response Code in step S213.

In the following steps S214 and S215, a scenario identical to that previously described will be discussed where a loop occurs for data sent by the LwM2M client 10 intended for the application server 12.

Thus, the LwM2M client 10 sends a message including the data as well as the hop-limit value being "5" in step S214, which reaches the first proxy 11a decreasing the hop counter to "4", after which the second proxy 11b decreases the hop counter to "3", and the third proxy 11c increases the hop counter to "2".

In this scenario, instead of further transmitting the message comprising the data, the current hop counter value and hop-limit value to the application server 12, the third proxy 11c sends the message back to the second proxy 11b which decreases the hop counter to "1" and then sends the message back to the third proxy 11c which decreases the hop counter to "0", thereby creating a loop for the message among the proxies 11a-11c.

At this stage, the hop-limit value of "5" is reached, which has as an effect that the third proxy 11c is not allowed to forward the message to the application server 11 and may even drop the message.

Further, the third proxy 11c informs the LwM2M client 10 in step S214 that the hop-limit value has been reached with a 5.08 error message. At this stage, the LwM2M server 13 is not aware of that the hop-limit was reached and that the message thus did not reach the application server 12.

Advantageously, the LwM2M client 10 informs the LwM2M server 13 in step S215 that the hop-limit was reached, and possibly further informs the LwM2M server 13 of the hop-limit value (being 5) with a 2.05 content message. The LwM2M client 10 may further explicitly inform the LwM2M server 13 that the data intended for the application server 12 never reached the application server 12.

Further advantageous is that by maintaining the LwM2M data format when exchanging messages, reuse of the existing IoT stack on LwM2M devices is enabled.

Figure 3:
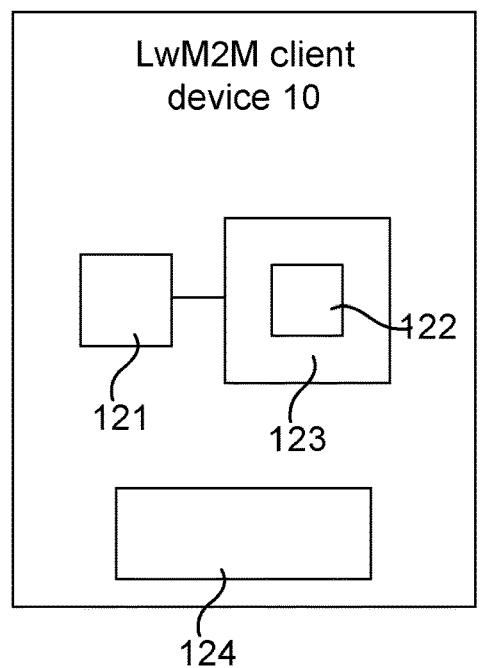
FIG. 3 illustrates an LwM2M client device according to an embodiment.

FIG. 3 illustrates an LwM2M device 10 configured to control transmission of data in a network according to an embodiment. FIG. 3 illustrates the LwM2M device in the form of an LwM2M client device 10. The steps of the method performed by the LwM2M client device 10 are in practice performed by a processing unit 121 embodied in the form of one or more microprocessors arranged to execute a computer program 122 downloaded to a suitable storage medium 123 associated with the microprocessor, such as a Random Access Memory (RAM), or a non-volatile storage medium such as a Flash memory or a hard disk drive. The processing unit 121 is arranged to cause the LwM2M client device 10 to carry out the method according to embodiments described herein, when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc. The LM2M client device 12 further comprises a wired of wireless interface 124 over which data may be received and transmitted.

Figure 4:
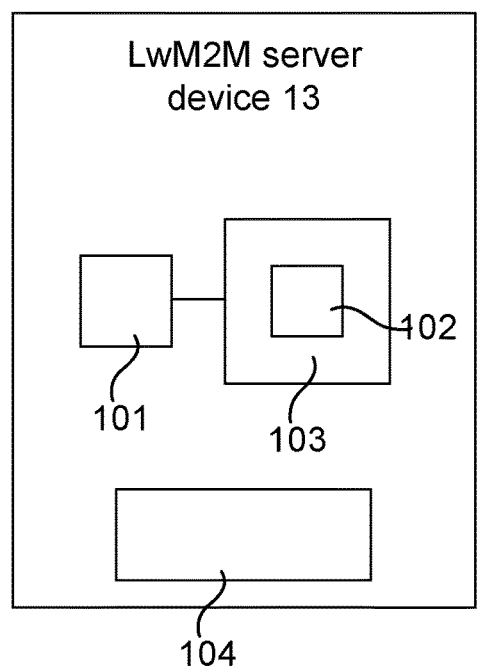
FIG. 4 illustrates an LwM2M server device according to an embodiment.

FIG. 4 illustrates a LwM2M device 13 configured to control transmission of data in a network according to an embodiment. FIG. 4 illustrates the LwM2M device in the form of an LwM2M server device 13, i.e., an LwM2M managing device. The steps of the method performed by the LwM2M server device 13 are in practice performed by a processing unit 101 embodied in the form of one or more microprocessors arranged to execute a computer program 102 downloaded to a suitable storage medium 103 associated with the microprocessor, such as a RAM, or a non-volatile storage medium such as a Flash memory or a hard disk drive. The processing unit 101 is arranged to cause the LM2M server device 13 to carry out the method according to embodiments described herein, when the appropriate computer program 102 comprising computer-executable instructions is downloaded to the storage medium 103 and executed by the processing unit 101. The storage medium 103 may also be a computer program product comprising the computer program 102. Alternatively, the computer program 102 may be transferred to the storage medium 103 by means of a suitable computer program product, such as a DVD or a memory stick. As a further alternative, the computer program 102 may be downloaded to the storage medium 103 over a network. The processing unit 101 may alternatively be embodied in the form of a DSP, an ASIC, an FPGA, a CPLD, etc. The LwM2M server device 13 further comprises a wired of wireless interface 104 over which data may be received and transmitted.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a Lightweight Machine to Machine, LwM2M, device of controlling transmission of data in a network, the method comprising:
sending a message comprising data towards an intended receiver, the message including information indicating a maximum number of hops allowed for the message, thereby allowing a node in the network receiving the message at each hop to update a hop counter and further to discontinue forwarding of the message towards the intended receiver when the hop counter indicates that the maximum number of hops has been reached;
receiving, from the node, an indication that the hop counter has reached the maximum number of hops; and
sending, to an LwM2M managing device, information indicating that the hop counter has reached the maximum number of hops.

2. The method of claim 1, further comprising:
sending a registration request to the LwM2M managing device comprising the information indicating the maximum number of hops allowed for the message.

3. The method of claim 2, further comprising:
receiving a registration confirmation from the LwM2M managing device.

4. The method of claim 1, further comprising, in cases where the message was successfully received at the intended receiver:
receiving, from the intended receiver, an indication of the number of hops having been performed for the message from the LwM2M device to the intended receiver; and
sending, to the LwM2M managing device, information indicating the number of hops having been performed for the message from the LwM2M device to the intended receiver.

5. The method of claim 4, further comprising:
receiving, from the LwM2M managing device, information indicating an adjusted maximum number of hops allowed.

6. The method of claim 5, further comprising:
sending a further message comprising data to the intended receiver, the message including information indicating the adjusted maximum number of hops allowed for the message.

7. A method of a Lightweight Machine to Machine, LwM2M, managing device of controlling transmission of data in a network, the method comprising:
receiving, from an LwM2M device, an indication that a maximum number of hops allowed for a message sent from the LwM2M device towards an intended receiver has been reached without the message having been received by the intended receiver.

8. The method of claim 7, further comprising:
receiving a registration request from the LwM2M device comprising information indicating the maximum number of hops allowed for the message, in response to which the LwM2M device is registered with the network.

9. The method of claim 8, further comprising:
sending a registration confirmation to the LwM2M device.

10. The method of claim 7, further comprising, in case the message was successfully received at the intended receiver:
receiving, from the LwM2M device, an indication of the number of hops having been performed for the message from the LwM2M device to the intended receiver;
adjusting the maximum number of hops allowed; and
sending, to the LwM2M device, information indicating the adjusted maximum number of hops allowed.

11. A Lightweight Machine to Machine, LwM2M, device configured to control transmission of data in a network, the LwM2M device comprising a processing unit and a memory, the memory containing instructions executable by the processing unit to configured the LwM2M device to:
send a message comprising data towards an intended receiver, the message including information indicating a maximum number of hops allowed for the message, thereby allowing a node in the network receiving the message at each hop to update a hop counter and further to discontinue forwarding of the message towards the intended receiver when the hop counter indicates that the maximum number of hops has been reached;
receive, from the node, an indication that the hop counter has reached the maximum number of hops; and
send, to an LwM2M managing device, information indicating that the hop counter has reached the maximum number of hops.

12. The LwM2M device of claim 11, further configured to:
send a registration request to the LwM2M managing device comprising the information indicating the maximum number of hops allowed for the message.

13. The LwM2M device of claim 11, further configured to:
receive a registration confirmation from the LwM2M managing device.

14. The LwM2M device of claim 11, further configured to, in cases where-the message was successfully received at the intended receiver:
receive, from the intended receiver, an indication of the number of hops having been performed for the message from the LwM2M device to the intended receiver; and
send, to the LwM2M managing device, the indication of the number of hops having been performed for the message from the LwM2M device to the intended receiver.

15. The LwM2M device of claim 14, further configured to:
receive, from the LwM2M managing device, information indicating an adjusted maximum number of hops being allowed.

16. The LwM2M device of claim 15, further configured to:
send a further message comprising data to the intended receiver, the message including information indicating the adjusted maximum number of hops allowed for the message.

17. A Lightweight Machine to Machine, LwM2M, managing device configured to control transmission of data in a network, the LwM2M managing device comprising a processing unit and a memory, said the memory containing instructions executable by the processing unit to configure the LwM2M managing device to:
receive, from an LwM2M device, an indication that a maximum number of hops allowed for a message sent from the LwM2M device towards an intended receiver has been reached without the message having been received by the intended receiver.

18. The LwM2M managing deviceof claim 17, further configured to:
receive a registration request from the LwM2M device comprising an indication of the maximum number of hops allowed for the message, in response to which the LwM2M device is registered with the network.

19. The LwM2M managing device of claim 18, further configured to:
send a registration confirmation to the LwM2M device.

20. The LwM2M managing device claim 17, further configured, in cases where the message was successfully received at the intended receiver , to:
receive, from the LwM2M device, an indication of the number of hops having been performed for the message from the LwM2M device to the intended receiver;
adjust the maximum number of hops being allowed; and
send, to the LwM2M device, information indicating the adjusted maximum number of hops being allowed.

* * * * *